United States Patent
Kessler et al.

(10) Patent No.: US 7,342,584 B2
(45) Date of Patent: Mar. 11, 2008

(54) METHOD AND COMPUTER PROGRAM FOR IMPLEMENTING INTERACTIVE BARGRAPHS OF ANY SHAPE OR DESIGN ON A GRAPHICAL USER INTERFACE

(75) Inventors: Joseph P. Kessler, Wylie, TX (US); Mark R. Lee, Richardson, TX (US); Robert M. Whapham, Richardson, TX (US)

(73) Assignee: AMX, LLC, Richardson, TX (US)

( * ) Notice: Subject to any disclaimer, the term of this patent is extended or adjusted under 35 U.S.C. 154(b) by 67 days.

(21) Appl. No.: 10/992,087

(22) Filed: Nov. 18, 2004

(65) Prior Publication Data
US 2006/0103651 A1    May 18, 2006

(51) Int. Cl.
G06T 11/20 (2006.01)
G06F 3/048 (2006.01)

(52) U.S. Cl. .................................. 345/440.2; 715/768

(58) Field of Classification Search ................ 345/440, 345/440.2; 715/771, 772, 773, 833, 832, 715/768
See application file for complete search history.

(56) References Cited

U.S. PATENT DOCUMENTS

| | | | |
|---|---|---|---|
| 4,914,527 A | 4/1990 | Asai et al. | |
| 5,130,794 A | 7/1992 | Ritchey | |
| RE34,611 E | 5/1994 | Fenwick et al. | |
| 5,455,619 A | 10/1995 | Truckenmiller et al. | |
| 5,818,512 A | 10/1998 | Fuller | |
| 5,832,218 A | 11/1998 | Gibbs et al. | |
| 5,844,572 A * | 12/1998 | Schott | 345/440 |
| 5,920,694 A | 7/1999 | Carleton et al. | |
| 6,061,717 A | 5/2000 | Carleton et al. | |
| 6,104,414 A | 8/2000 | Odryna et al. | |
| 6,105,055 A | 8/2000 | Pizano et al. | |
| 6,160,544 A | 12/2000 | Hayashi et al. | |
| 6,232,932 B1 | 5/2001 | Thorner | |
| 6,333,753 B1 * | 12/2001 | Hinckley | 715/768 |
| 6,342,906 B1 | 1/2002 | Kumar et al. | |
| 6,415,328 B1 | 7/2002 | Korst | |
| 6,421,717 B1 | 7/2002 | Kloba et al. | |
| 6,446,130 B1 | 9/2002 | Grapes | |

(Continued)

FOREIGN PATENT DOCUMENTS

WO    WO 02/057939    7/2002

OTHER PUBLICATIONS

Real/VNC, "the original open-source cross-platform remote control solution," Feb. 9, 2003, Real/VNC Ltd, pp. 1-2 http://web.archive.org/web/20030207115348/http://www.realvnc.com/what.html.

(Continued)

Primary Examiner—Kee M. Tung
Assistant Examiner—Michelle K Lay
(74) Attorney, Agent, or Firm—Gardere Wynne Sewell, LLP; Karl L. Larson; Robert J. Ward

(57) ABSTRACT

A method and computer program are provided for implementing an interactive bargraph that includes associating an interactive bargraph with an independent touch map image having a plurality of pixel values, displaying the interactive bargraph, determining a current level of the interactive bargraph based on the content of the touch map image, and updating the display of the interactive bargraph based on the current level of the interactive bargraph.

28 Claims, 4 Drawing Sheets

U.S. PATENT DOCUMENTS

| | | |
|---|---|---|
| 6,493,758 B1 | 12/2002 | McLain |
| 6,501,511 B2 | 12/2002 | Sekimoto et al. |
| 6,507,867 B1 | 1/2003 | Holland et al. |
| 6,542,165 B1 | 4/2003 | Ohkado |
| 6,546,405 B2 | 4/2003 | Gupta et al. |
| 6,650,963 B2 | 11/2003 | DiLorenzo |
| 6,697,376 B1 | 2/2004 | Son et al. |
| 6,732,183 B1 | 5/2004 | Graham |
| 6,744,771 B1 | 6/2004 | Barber et al. |
| 6,775,654 B1 | 8/2004 | Yokoyama et al. |
| 6,791,554 B1 | 9/2004 | Mergard et al. |
| 6,801,529 B1 | 10/2004 | McGrane et al. |
| 6,829,368 B2 | 12/2004 | Meyer et al. |
| 6,865,596 B1 | 3/2005 | Barber et al. |
| 6,868,403 B1 | 3/2005 | Wiser et al. |
| 6,870,518 B1 | 3/2005 | Brenner |
| 6,903,706 B1 | 6/2005 | Trottier et al. |
| 6,934,414 B2 * | 8/2005 | Kondo et al. ............... 382/199 |
| 6,937,766 B1 | 8/2005 | Wilf et al. |
| 6,985,966 B1 | 1/2006 | Gupta et al. |
| 7,038,699 B2 | 5/2006 | Sato et al. |
| 7,076,153 B2 | 7/2006 | Ando et al. |
| 7,103,668 B1 | 9/2006 | Corley et al. |
| 7,130,908 B1 | 10/2006 | Pecus et al. |
| 2002/0052781 A1 | 5/2002 | Aufricht et al. |
| 2002/0054160 A1 | 5/2002 | Partridge et al. |
| 2002/0073076 A1 | 6/2002 | Xu et al. |
| 2002/0083145 A1 | 6/2002 | Perinpanathan |
| 2002/0129094 A1 | 9/2002 | Reisman |
| 2002/0161826 A1 | 10/2002 | Arteaga et al. |
| 2002/0176601 A1 | 11/2002 | Rhoads |
| 2003/0023657 A1 | 1/2003 | Fischer |
| 2003/0035556 A1 | 2/2003 | Curtis et al. |
| 2003/0037261 A1 | 2/2003 | Meffert et al. |
| 2003/0048299 A1 | 3/2003 | Stern |
| 2003/0101458 A1 | 5/2003 | Jacobson |
| 2003/0149574 A1 | 8/2003 | Rudman |
| 2003/0191850 A1 | 10/2003 | Thornton |
| 2004/0034864 A1 | 2/2004 | Barrett et al. |
| 2004/0196255 A1 | 10/2004 | Cheng |

OTHER PUBLICATIONS

M. Bickley, et al., Using Servers to Enhance Control System Capability, Proceedings of the 1999 Particle Accelerator Conference (IEEE 1999).

Fohler, et al., SALSART—A Web Based Cooperative Environment for Office Real-time Schedule Design, Proceedings of the 10th Euromicro Workshop on Parallel, Distributed and Network-based Processing (IEEE Computer Society 2002).

Giguere, Mobile Data Management: Challenges of Wireless and Offline Data Access (IEEE 2001).

* cited by examiner

METHOD AND COMPUTER PROGRAM FOR IMPLEMENTING INTERACTIVE BARGRAPHS OF ANY SHAPE OR DESIGN ON A GRAPHICAL USER INTERFACE

BACKGROUND OF THE INVENTION

1. Field of the Invention

The present invention relates to graphical user interfaces and more particularly, relates to a method and computer program for implementing interactive bargraphs capable of any shape or design on a graphical user interface.

2. Discussion of the Background

Devices having one or more graphical user interfaces (GUI) commonly represent data as graphical icons, also referred to as "widgets." These widgets may be patterned after real-world physical objects including, but not limited to, dials, switches, buttons, and scales. For instance, a bar graph is a graph consisting of parallel, usually vertical bars or rectangles with lengths proportional to the frequency with which specified quantities occur in a set of data. A bar graph is commonly represented on a GUI as a bargraph widget. A GUI bargraph widget that may be manipulated by a user to interactively change the level and graphical representation associated therewith is commonly referred to as an interactive bargraph widget. However, the graphical form of an interactive bargraph widget is generally limited in its shape or design to straight lines aligned either horizontally or vertically. This is due to the fact that an interactive bargraph widget having a non-conventional shape or design, such as a radial or even more complex shape, requires complex calculations to determine the level and graphical representation associated with the bargraph widget when it is interactively manipulated by the user. Further, an interactive bargraph widget having a non-conventional shape or design must be custom programmed to handle that non-conventional shape. For instance, it would be highly difficult, if not impossible, for an interactive bargraph widget to handle the non-conventional shapes 20a-20f shown in FIG. 2. Thus, there does not exist an efficient implementation of an interactive bargraph widget that is capable of any shape or design.

SUMMARY OF THE INVENTION

Accordingly, one object of the present invention is to provide a method for implementing an interactive bargraph that includes associating an interactive bargraph with an independent touch map image having a plurality of pixel values, displaying the interactive bargraph, determining a current level of the interactive bargraph based on the content of the touch map image, and updating the display of the interactive bargraph based on the current level of the interactive bargraph.

Another object of the present invention is to provide a computer program for implementing an interactive barograph that includes a first computer code for associating an interactive bargraph with an independent touch map image having a plurality of pixel values, a second computer code for displaying the interactive bargraph, a third computer code for determining a current level of the interactive bargraph based on the content of the touch map image, and a forth computer code for updating the display of the interactive bargraph based on the current level of the interactive bargraph.

Yet another object of the present invention is to provide a method for determining a current level of an interactive bargraph that includes associating an interactive bargraph with an independent non-visible touch map image having a plurality of pixel values, retrieving a current pointer coordinate from the interactive bargraph, translating the current pointer coordinate into the touch map image, retrieving one of the plurality of pixel values based on an image coordinate of the touch map image, and determining the current level of the interactive bargraph based on the retrieved pixel value.

Another object of the present invention is to provide a computer program for determining a current level of an interactive bargraph that includes a first computer code for associating an interactive bargraph with an independent non-visible touch map image having a plurality of pixel values, a second computer code for retrieving a current pointer coordinate from the interactive bargraph, a third computer code for translating the current pointer coordinate into the touch map image, a forth computer code for retrieving one of the plurality of pixel values based on an image coordinate of the touch map image, and a fifth computer code for determining the current level of the interactive bargraph based on the retrieved pixel value.

Yet another object of the present invention is to provide a method for determining a current level of an interactive bargraph that includes associating an interactive bargraph with a plurality of dependent visible touch map images each having a plurality of pixel values, retrieving a current pointer coordinate from the interactive bargraph, translating the current pointer coordinate into a corresponding one of the plurality of touch map images, retrieving one of the plurality of pixel values based on an image coordinate of the corresponding one of the plurality of touch map images, and determining the current level of the interactive bargraph based on the retrieved pixel value.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein.

DETAILED DESCRIPTION OF THE PREFERRED EMBODIMENTS

Figure 1A:
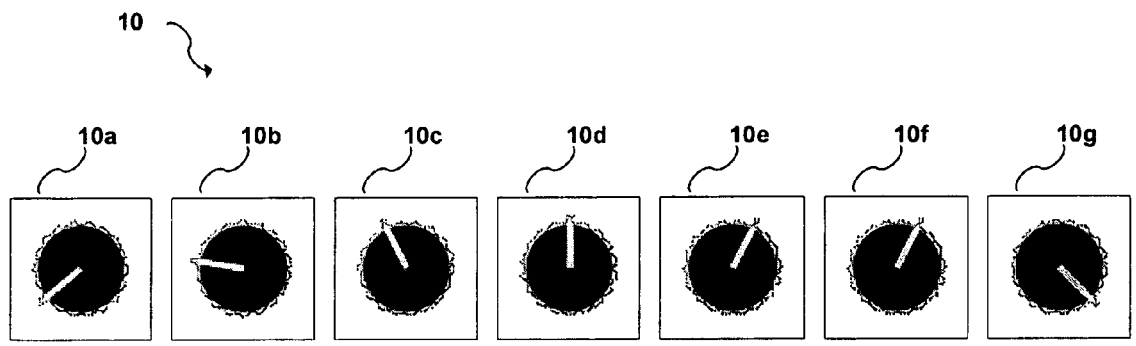
FIG. 1a illustrates several incremental steps of an exemplary interactive radial bargraph widget according to the present invention.

Referring now to the drawings, wherein like reference numerals designate identical or corresponding parts throughout the several views, preferred embodiments of the present invention are described.

The present invention provides a user with the ability implement an interactive bargraph widget of any shape or design by coupling the interactive bargraph widget with an image, such as an independent non-visible touch map image. A touch map image having various gradient or possibly even random pixel values is graphically aligned with an interactive bargraph widget of any shape or design. Each pixel of the touch map image has an associated value, including, but not limited to, RGB values. For instance, a touch map image may contain 257 different values including 254 shades of gray, black, white and transparent. However, the touch map image in this configuration does not convey any graphical information and, thus, is not visible. Instead, the touch map image is used to denote a current "touch weight" of a pixel at a selected (x, y) coordinate of the corresponding interactive bargraph widget.

Figure 1B:
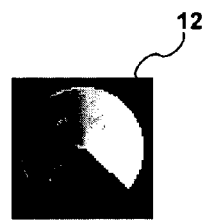
FIG. 1b illustrates an exemplary touch map image that corresponds to an interactive bargraph widget according to the present invention.
Figure 1C:
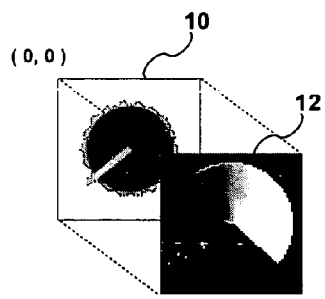
FIG. 1c illustrates a graphical alignment between a touch map image and an interactive bargraph widget according to the present invention.

For example, several incremental steps 10a-10g of an interactive radial bargraph widget 10 which operates like real-world knob according to the present invention are shown in FIG. 1a. In this example, a user may manipulate the radial bargraph widget 10 to various positions including, but not limited to, any of the seven steps 10a-10g shown in FIG. 1. Referring to FIGS. 1b and 1c, a touch map image 12 having various gradient RGB values is graphically aligned with and corresponds to the radial bargraph widget 10. For instance, the touch map image 12 may be graphically aligned with the radial bargraph widget 10 such that each of their top-left corners are aligned, indicated as (0,0) in FIG. 1c. However, other means of graphical alignment are possible and within the scope of the present invention. When a user selects a particular (x, y) offset within the radial bargraph widget 10, the pixel value corresponding to the same and/or translated (x, y) offset within the touch map image 12 is returned as the touch weight value. The touch weight is then used to determine the value, or "level," associated with the radial bargraph widget 10 and to update the display of the radial bargraph widget 10. For instance, the display of the radial bargraph widget 10 may be updated to display various positions including, but not limited to, any of the seven steps 10a-10g shown in FIG. 1a.

Optionally, in an alternate configuration the image may also be configured as a dependent visible image that is displayed as a portion of the interactive bargraph widget. In this configuration, multiple touch map images having various gradient or possibly even random pixel values are used not only to denote a current "touch weight" of a pixel at a selected (x, y) coordinate, but also to graphically represent the visible portion of the interactive bargraph widget itself.

The present invention may be considered in a Model-View-Controller (MVC) user interface paradigm context, although it is not limited to such. In a MVC user interface paradigm: a controller interprets inputs from the user and maps these user actions into commands that are sent to a model and/or view to effect the appropriate change; the model manages one or more data elements, responds to queries about its state, and responds to instructions to change state; and the view is responsible for presenting data to the user through a combination of graphics and text. In this context, the touch map image would be a portion of the controller, the visible portion of the interactive bargraph widget would represent the view, and the current level of the interactive bargraph widget would be a portion of the model.

Figure 2:
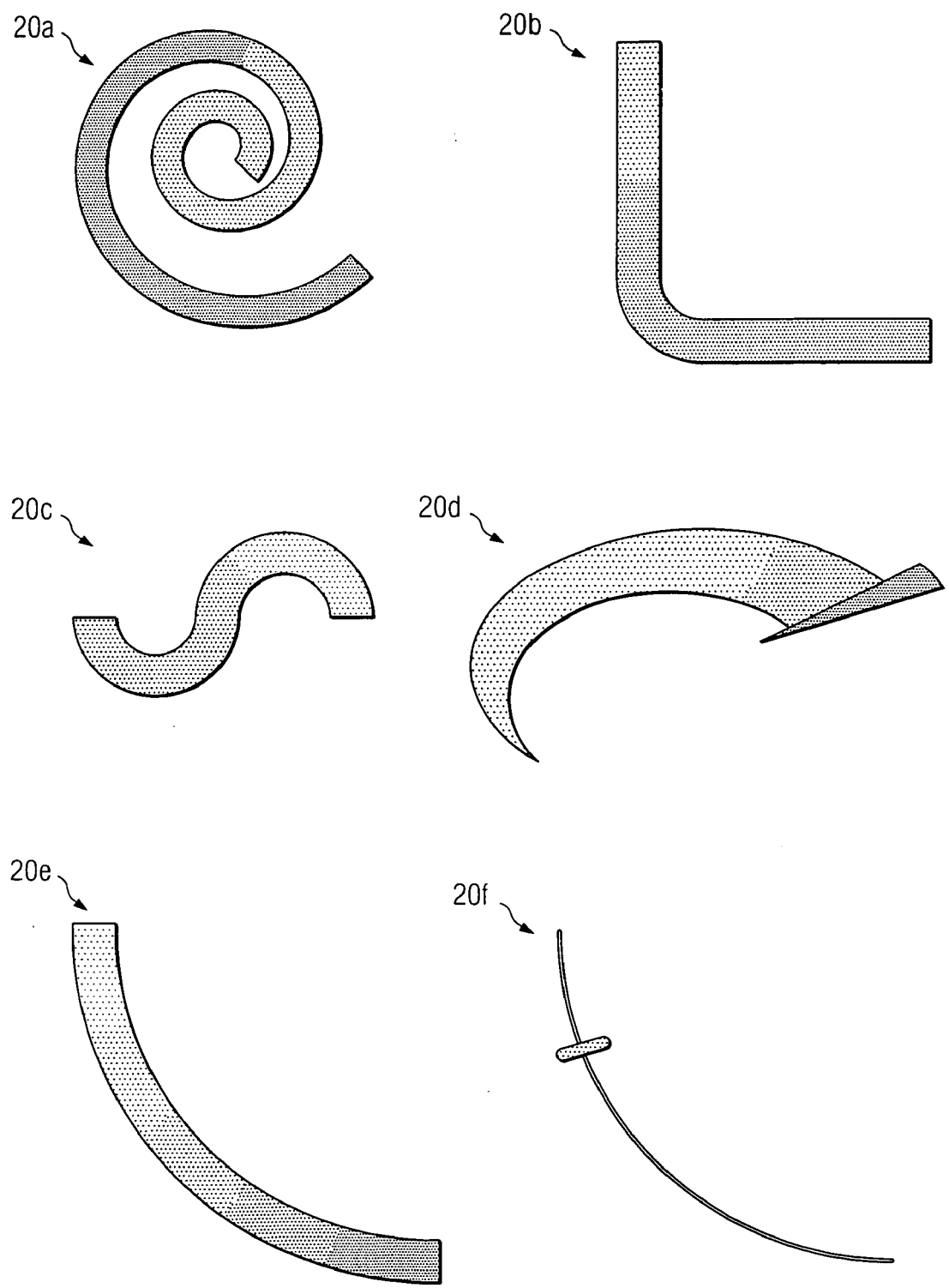
FIG. 2 illustrates several exemplary interactive bargraphs of various non-conventional shapes according to the present invention.

Because the present invention uses a touch map image 12 that is graphically aligned with and corresponds to the interactive bargraph widget 10, an interactive bargraph widget 10 of any shape or design may be implemented simply by generating and/or manipulating the graphical pixel values of the corresponding touch map image 12. For instance, FIG. 2 illustrates several exemplary interactive bargraphs of various non-conventional shapes 20a-20f according to the present invention. Additionally, because the level of the interactive bargraph widget is determined based on the touch map image, no complex calculations are necessary, thereby improving the efficiency of the interactive bargraph widget.

Figure 3A:
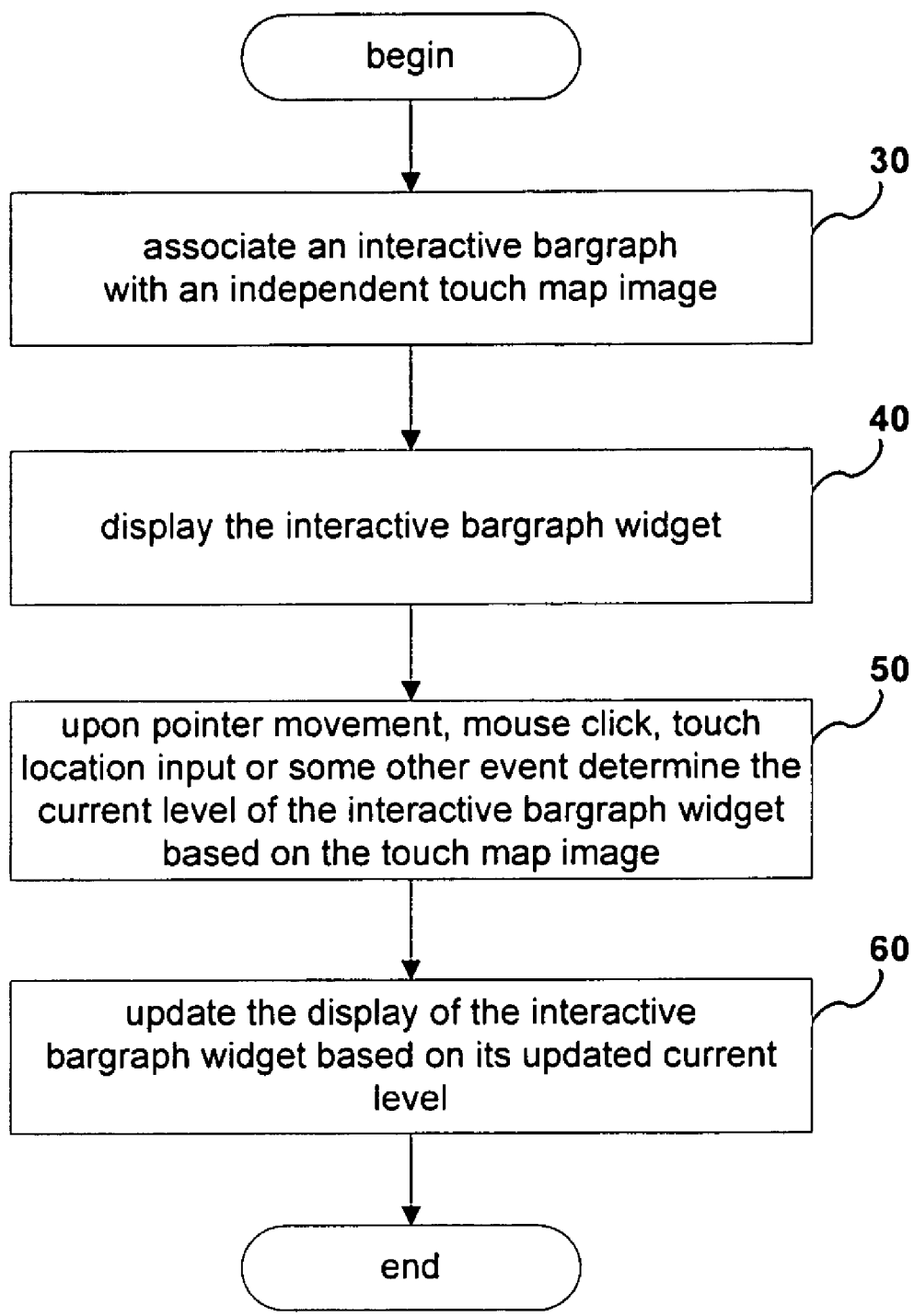
FIG. 3a is a flow chart for implementing an interactive bargraph widget according to the present invention.

Referring to FIG. 3a, a flow chart for implementing an interactive bargraph widget according to the present invention, is shown. An interactive bargraph widget 10 is associated with an independent touch map image 12, as shown at block 30. At Block 40, the interactive bargraph widget is graphically displayed. Upon pointer movement, mouse click, touch location input or some other event, including but not limited to a timer event, the updated current level of the interactive bargraph widget is determined, as shown at Block 50. Finally, at block 60, the display of the interactive bargraph widget 10 is updated based on the current level.

Figure 3B:
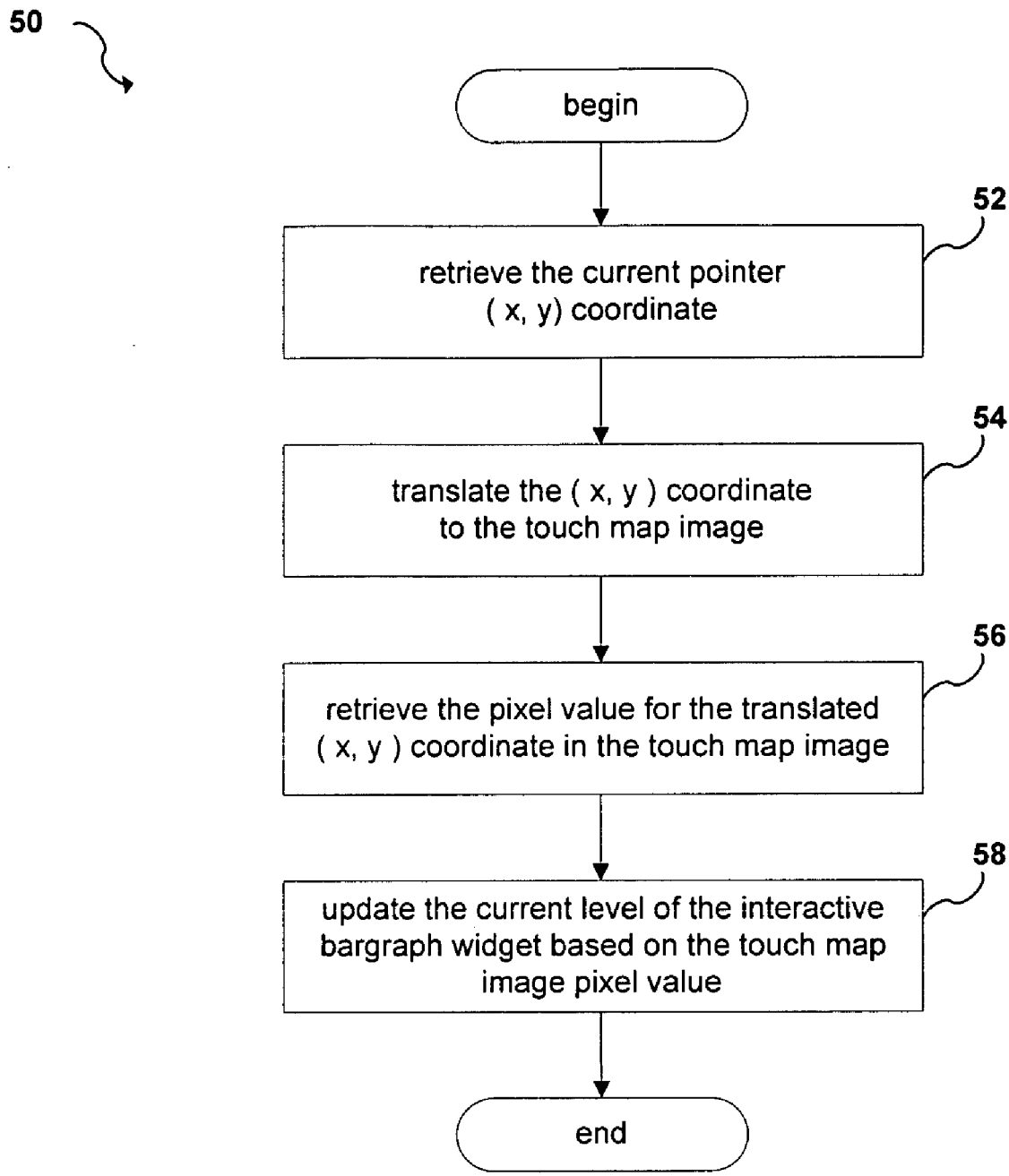
FIG. 3b is a flow chart for determining a current level of an interactive bargraph widget according to the present invention.

Referring to FIG. 3b, a flow chart for determining a current level of an interactive bargraph widget according to the present invention, is shown. At Block 52, the current pointer (x, y) coordinate of an interactive bargraph widget 10 is retrieved. The (x, y) coordinate is then translated to an image coordinate in a touch map image 12, as shown at Block 54. Translating may be optional where the touch map image 12 is the same size as the interactive bargraph widget 10. At Block 56, the pixel value associated with the translated (x, y) coordinate in the touch map image is retrieved. The current level of the interactive bargraph widget 10 is updated based on the touch map image pixel value, as shown at Block 58.

The processes and mechanisms set forth in the present description may be implemented using a conventional general purpose microprocessor, or silicon as part of a graphics accelerator chip and/or subsystem, programmed according to the teachings in the present specifications, as will be appreciated to those skilled in the relevant art. Appropriate software can be prepared based upon the teachings of the present disclosure, as will also be apparent to those skilled in the relevant arts.

The present invention thus includes a computer program which may be hosted on a storage medium and includes instructions which perform the processes set forth in the present specification. The storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, many other modifications and variations of the present invention are possible in light of the above teachings. The specific embodiments discussed herein are merely illustrative, and are not meant to limit the scope of the present invention in any manner. It is therefore to be understood that within the scope of the disclosed concept, the invention may be practiced otherwise then as specifically described.

The invention claimed is:

1. A method for implementing an interactive bargraph slider, comprising:
   defining a non-visible independent touch map image having a plurality of predefined areas, each area having a plurality of pixel values;
   displaying an interactive bargraph slider widget having a plurality of predefined slider positions;

graphically aligning the interactive bargraph slider widget with the non-visible independent touch map image, wherein each of the plurality of slider positions is aligned with one or more of the plurality of areas;

retrieving a current pointer coordinate from the interactive bargraph slider widget;

retrieving one of the plurality of pixel values, wherein the retrieved pixel value has a graphical alignment that corresponds to the current pointer coordinate;

setting a current level of the interactive bargraph slider widget to the retrieved pixel value, wherein the current level is associated with one of the plurality of slider positions; and updating the display of the interactive bargraph slider widget based on the current level of the interactive bargraph slider widget.

2. The method of claim 1, wherein the touch map image comprises an independent image graphically aligned with the interactive bargraph slider widget.

3. The method of claim 2, wherein retrieving one of the plurality of pixel values includes translating the current pointer coordinate into the touch map image.

4. The method of claim 2, wherein the interactive bargraph slider widget is capable of any shape.

5. The method of claim 4, wherein the interactive bargraph slider widget is a radial shape.

6. The method of claim 2, wherein the interactive bargraph slider widget and the touch map image are of the same size.

7. The method of claim 2, wherein the interactive bargraph slider widget and the touch map image are different sizes.

8. The method of claim 2, wherein the touch map image comprises a plurality of RGB pixel values.

9. The method of claim 2, wherein the touch map image comprises a plurality of gradient pixel values.

10. The method of claim 2, wherein the touch map image comprises a plurality of random pixel values.

11. The method of claim 2, wherein the interactive bargraph slider widget comprises a visible image derived from the touch map image.

12. The method of claim 2, wherein the interactive bargraph slider widget comprises a plurality of visible images.

13. The method of claim 2, wherein the touch map image comprises a plurality of images.

14. A computer program embodied on a computer readable medium for implementing an interactive bargraph slider widget, comprising:

a first computer code for defining a non-visible independent touch map image having a plurality of predefined areas, each area having a plurality of pixel values;

a second computer code for displaying an interactive bargraph slider widget having a plurality of predefined slider positions;

a third computer code for graphically aligning the interactive bargraph slider widget with the non-visible independent touch map image, wherein each of the plurality of slider positions is aligned with one or more of the plurality of areas;

a fourth computer code for retrieving a current pointer coordinate from the interactive bargraph slider widget;

a fifth computer code for retrieving one of the plurality of pixel values, wherein the retrieved pixel value has a graphical alignment that corresponds to the current pointer coordinate, wherein the current level is associated with one of the plurality of slider positions; and a sixth computer code for updating the display of the interactive bargraph slider widget based on the current level of the interactive bargraph slider widget.

15. The computer program of claim 14, wherein the touch map image is graphically aligned with the interactive bargraph slider widget.

16. The computer program of claim 15, wherein the sixth computer code for retrieving one of the plurality of pixel values includes a seventh computer code for translating the current pointer coordinate into the touch map image.

17. The computer program of claim 15, wherein the interactive bargraph slider widget is capable of any shape.

18. The computer program of claim 17, wherein the interactive bargraph slider widget is a radial shape.

19. The computer program of claim 15, wherein the interactive bargraph slider widget and the touch map image are of the same size.

20. The computer program of claim 15, wherein the interactive bargraph slider widget and the touch map image are different sizes.

21. The computer program of claim 15, wherein the touch map image comprises a plurality of RGB pixel values.

22. The computer program of claim 15, wherein the touch map image comprises a plurality of gradient pixel values.

23. The computer program of claim 15, wherein the touch map image comprises a plurality of random pixel values.

24. The computer program of claim 15, wherein the interactive bargraph slider widget comprises a visible image derived from the touch map image.

25. The computer program of claim 15, wherein the interactive bargraph slider widget comprises a plurality of visible images.

26. The computer program of claim 15, wherein the touch map image comprises a plurality of images.

27. A method for determining a current level of an interactive bargraph slider widget, comprising:

defining a non-visible independent touch map image having a plurality of predefined areas, each area having a plurality of pixel values;

displaying an interactive bargraph slider widget having a plurality of predefined slider positions;

graphically aligning the interactive bargraph slider widget with the non-visible independent touch map image, wherein each of the plurality of slider positions is aligned with one or more of the plurality of areas;

retrieving a current pointer coordinate from the interactive bargraph slider widget;

translating the current pointer coordinate into the touch map image;

retrieving one of the plurality of pixel values, wherein the retrieved pixel value has a graphical alignment that corresponds to the translated current pointer coordinate; and setting a current level of the interactive bargraph slider widget to the retrieved pixel value, wherein the current level is associated with one of the plurality of slider positions.

28. A computer program embodied on a computer readable medium for determining a current level of an interactive bargraph slider widget, comprising:

a first computer code for defining a non-visible independent touch map image having a plurality of predefined areas, each area having a plurality of pixel values;

a second computer code for displaying an interactive bargraph slider widget having a plurality of predefined slider positions;

a third computer code for graphically aligning the interactive bargraph slider widget with the non-visible independent touch map image, wherein each of the plurality of slider positions is aligned with one or more of the plurality of areas;

a fourth computer code for retrieving a current pointer coordinate from the interactive bargraph slider widget;

a fifth computer code for translating the current pointer coordinate into the touch map image;

a sixth computer code for retrieving one of the plurality of pixel values, wherein the retrieved pixel value has a graphical alignment that corresponds to the translated current pointer coordinate; and a seventh computer code for setting a current level of the interactive bargraph slider widget to the retrieved pixel value, wherein the current level is associated with one of the plurality of slider positions.

* * * * *